United States Patent
Zhou et al.

(10) Patent No.: US 10,528,149 B2
(45) Date of Patent: Jan. 7, 2020

(54) OPERATION RECOGNITION METHOD AND APPARATUS

(71) Applicant: TENCENT TECHNOLOGY (SHENZHEN) COMPANY LIMITED, Shenzhen (CN)

(72) Inventors: Shilong Zhou, Shenzhen (CN); Rong Ran, Shenzhen (CN); Cheng Luo, Shenzhen (CN); Bin Li, Shenzhen (CN); Yu Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 134 days.

(21) Appl. No.: 15/826,167

(22) Filed: Nov. 29, 2017

(65) Prior Publication Data

US 2018/0088681 A1 Mar. 29, 2018

Related U.S. Application Data

(63) Continuation of application No. PCT/CN2016/095997, filed on Aug. 19, 2016.

(30) Foreign Application Priority Data

Aug. 25, 2015 (CN) .......................... 2015 1 0526258

(51) Int. Cl.
*G06F 3/01* (2006.01)

(52) U.S. Cl.
CPC .................................... *G06F 3/017* (2013.01)

(58) Field of Classification Search
None
See application file for complete search history.

(56) References Cited

U.S. PATENT DOCUMENTS

| | | | |
|---|---|---|---|
| 2010/0177037 | A1 | 7/2010 | Kim et al. |
| 2013/0147704 | A1* | 6/2013 | Kuo .......... G06F 3/017 345/156 |
| 2014/0333564 | A1* | 11/2014 | Hong ........ G06F 3/016 345/173 |

FOREIGN PATENT DOCUMENTS

| | | |
|---|---|---|
| CN | 101656787 A | 2/2010 |
| CN | 102006364 A | 4/2011 |
| CN | 102340595 A | 2/2012 |
| CN | 103152474 A | 6/2013 |
| CN | 103843313 A | 6/2014 |
| CN | 103873658 A | 6/2014 |
| CN | 104284007 A | 1/2015 |
| CN | 204157121 U | 2/2015 |

(Continued)

OTHER PUBLICATIONS

The World Intellectual Property Organization (WIPO) International Search Report for PCT/CN2016/095997 dated Nov. 4, 2016 7 Pages (including translation).

(Continued)

*Primary Examiner* — Nicholas J Lee
(74) *Attorney, Agent, or Firm* — Anova Law Group, PLLC

(57) ABSTRACT

An operation recognition method includes obtaining a data sequence including n pieces of data reflecting a movement of a mobile terminal, performing high-pass filtering on the data sequence to obtain n pieces of filtered data, and generating a current shake recognition result indicating that a shake operation occurs on the mobile terminal when one of the n pieces of filtered data exceeds a preset threshold.

20 Claims, 7 Drawing Sheets

(56) References Cited

FOREIGN PATENT DOCUMENTS

| | | |
|---|---|---|
| CN | 104469018 A | 3/2015 |
| CN | 105120090 A | 12/2015 |

OTHER PUBLICATIONS

The State Intellectual Property Office of the People's Republic of China (SIPO) Office Action 1 for 201510526258.X dated Sep. 20, 2017 9 Pages (including translation).

* cited by examiner

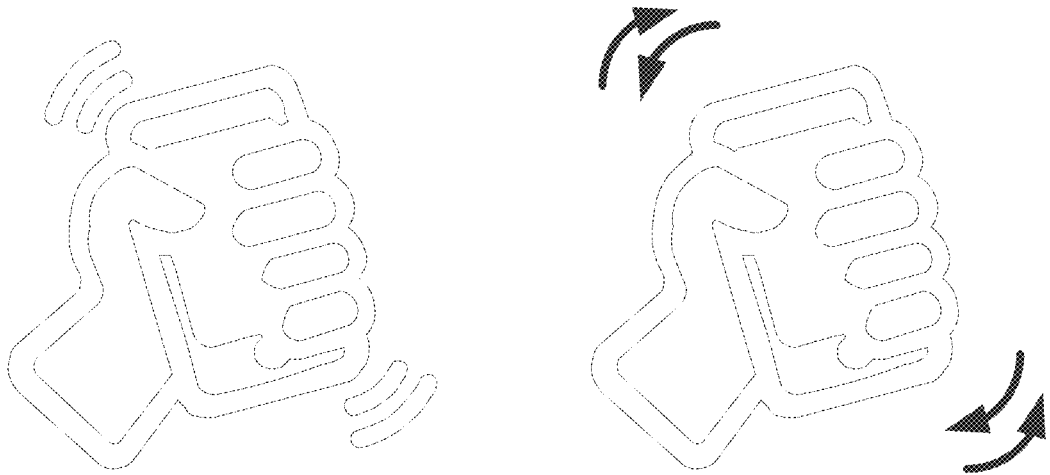

FIG. 3

Obtain a data sequence collected by a sensor in a mobile terminal, the data sequence including n pieces of data collected according to a predetermined interval — 202

Obtain n pieces of filtered data through calculation according to the following formula:

$$y[i]=\alpha*y[i-1]+\alpha*(x[i]-x[i-1])$$

— 204a

Detect, for each piece of filtered data, whether the filtered data exceeds a preset threshold — 206

Generate a recognition result indicating that a shake operation occurs on the mobile terminal, when the filtered data exceeds the preset threshold — 208

FIG. 4

OPERATION RECOGNITION METHOD AND APPARATUS

CROSS-REFERENCE TO RELATED APPLICATIONS

This application is a continuation application of International Application No. PCT/CN2016/095997, filed on Aug. 19, 2016, which claims priority to Patent Application No. 201510526258.X, filed with the Chinese Patent Office on Aug. 25, 2015 and titled "OPERATION RECOGNITION METHOD AND APPARATUS," the entire contents of both of which are incorporated herein by reference.

FIELD OF THE TECHNOLOGY

Embodiments of the present disclosure relate to the field of mobile terminals, and in particular, to an operation recognition method and apparatus.

BACKGROUND OF THE DISCLOSURE

A shake operation is an operation that a user shakes a mobile terminal. The shake operation is a common triggering operation used on a mobile terminal. The mobile terminal may be a smartphone, a tablet computer, an ebook, or the like.

The shake operation may be recognized by means of a built-in three-axis accelerometer of the mobile terminal. Specifically, the three-axis accelerometer collects accelerations on three coordinate axes, namely, x-axis, y-axis, and z-axis. When the acceleration in one direction changes from a positive acceleration to a negative acceleration, or changes from a negative acceleration to a positive acceleration within a predetermined time interval, the mobile terminal recognizes the change between the positive acceleration and the negative acceleration as a shake operation.

SUMMARY

In accordance with the present disclosure, there is provided an operation recognition method including obtaining a data sequence including n pieces of data reflecting a movement of a mobile terminal, performing high-pass filtering on the data sequence to obtain n pieces of filtered data, and generating a current shake recognition result indicating that a shake operation occurs on the mobile terminal when one of then pieces of filtered data exceeds a preset threshold.

Also in accordance with the present disclosure, there is provided an operation recognition apparatus including a processor and a memory storing a computer program that, when executed by the processor, causes the processor to obtain a data sequence including n pieces of data reflecting a movement of a mobile terminal, perform high-pass filtering on the data sequence to obtain n pieces of filtered data, and generate a current shake recognition result indicating that a shake operation occurs on the mobile terminal when one of the n pieces of filtered data exceeds a preset threshold.

Also in accordance with the present disclosure, there is provided a mobile terminal including a sensor configured to collect a data sequence comprising n pieces of data reflecting a movement of the mobile terminal, a processor, and a memory storing a computer program that, when executed by the processor, causes the processor to obtain the data sequence, perform high-pass filtering on the data sequence to obtain n pieces of filtered data, and generate a current shake recognition result indicating that a shake operation occurs on the mobile terminal when one of the n pieces of filtered data exceeds a preset threshold.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3 is a schematic diagram of two shaking manners according to an embodiment of the present disclosure;

FIG. 4 is a flowchart of an operation recognition method according to another embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
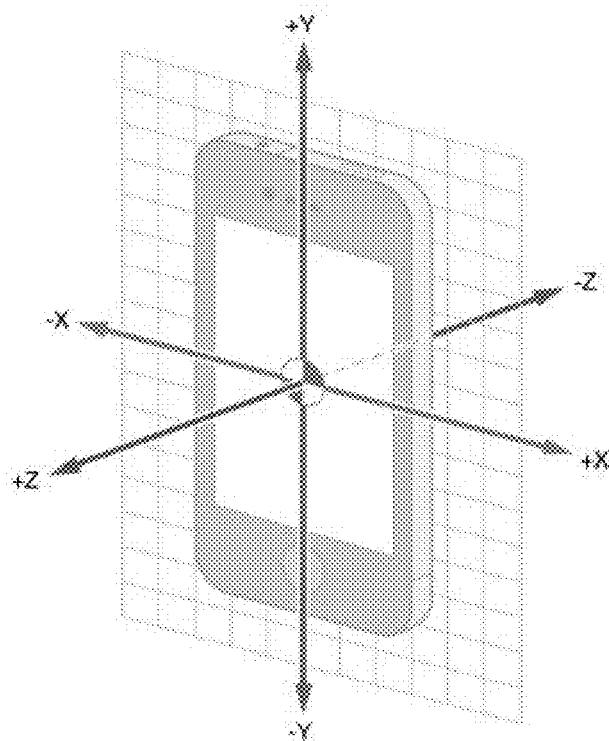
FIG. 1 is a schematic structural diagram of a mobile terminal according to an embodiment of the present disclosure.

FIG. 1 is a schematic structural diagram of a mobile terminal according to an embodiment of the present disclosure. The mobile terminal may be a mobile phone, a tablet computer, an ebook reader, a Moving Picture Experts Group Audio Layer III (MP3) player, a Moving Picture Experts Group Audio Layer IV (MP4) player, a laptop portable computer, or the like.

A sensor (not shown in the figure), such as a three-axis accelerometer and/or a gyro sensor, configured to collect movement data of the mobile terminal is disposed in the mobile terminal.

Coordinate axes established by the sensor in the mobile terminal include: an x-axis, a y-axis, and a z-axis. An origin corresponding to the x-axis, the y-axis, and the z-axis is the center of the mobile terminal. The x-axis is parallel to the horizontal direction of a front face of the mobile terminal, when a user looks squarely at the front face of the mobile terminal, the left side of the horizontal direction is a negative semi-axis direction of the x-axis, and the right side of the horizontal direction is a positive semi-axis direction of the x-axis. The y-axis is parallel to the vertical direction of the front face of the mobile terminal, when a user looks squarely at the front face of the mobile terminal, the upper side of the vertical direction is a positive semi-axis direction of the y-axis, and the lower side of the vertical direction is a negative semi-axis direction of the y-axis. The z-axis is perpendicular to the front face of the mobile terminal, a direction in which the front face of the mobile terminal faces outward is a positive semi-axis direction of the z-axis, and a direction in which the back face of the mobile terminal faces outward is a negative semi-axis direction of the z-axis.

Figure 2:
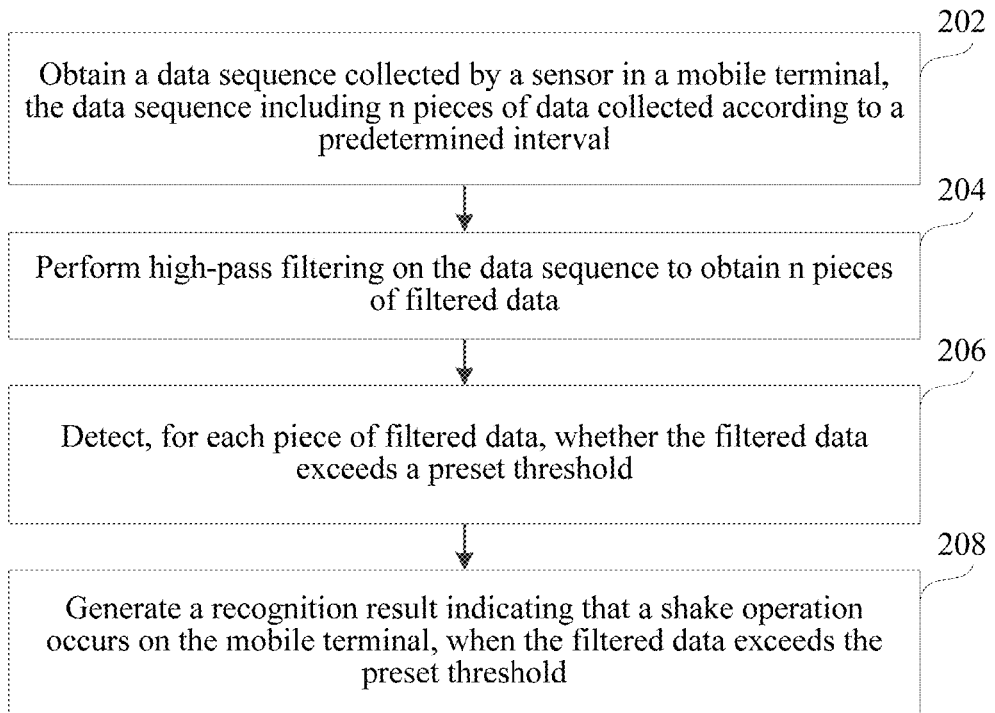
FIG. 2 is a method flowchart of an operation recognition method according to an embodiment of the present disclosure.

FIG. 2 is a flowchart of an operation recognition method according to an embodiment of the present disclosure. This embodiment is described by using an example in which the operation recognition method is applied to a mobile terminal provided with a sensor.

As shown in FIG. 2, at 202, a data sequence collected by the sensor of the mobile terminal is obtained. The data sequence includes n pieces of data collected according to a predetermined time interval, where n is a positive integer.

The sensor of the mobile terminal collects data according to the predetermined time interval to obtain the data sequence. The sensor is a sensor configured to collect movement data of the mobile terminal. The data sequence includes n pieces of data.

There are usually two manners of shaking the mobile terminal by a user:

First, in a plane in which a front face of the mobile terminal is located, the mobile terminal is shaken back and forth along an arc. As shown on the left side of FIG. 3, this shaking manner is completed mainly by means of elbow motions of the user. This shaking manner may trigger an obvious change of acceleration data in an x-axis and a y-axis of a three-axis accelerometer.

Second, the mobile terminal is shaken in a rotation manner. As shown on the right side of FIG. 3, this shaking manner is completed mainly by means of wrist motions of the user. This shaking manner may trigger an obvious change of angular velocity data about the y-axis of a gyro sensor.

When the sensor includes the three-axis accelerometer, the mobile terminal obtains an acceleration data sequence corresponding to the x-axis, and an acceleration data sequence corresponding to the y-axis that are collected by the three-axis accelerometer. The acceleration data sequence corresponding to the x-axis includes n pieces of x-axis acceleration data, and the acceleration data sequence corresponding to the y-axis includes n pieces of y-axis acceleration data.

When the sensor includes the gyro sensor, the mobile terminal obtains an angular velocity data corresponding to the y-axis collected by the gyro sensor. That is, the data sequence includes an angular velocity data sequence collected by using the y-axis as a rotation axis.

At 204: a high-pass filtering is performed on the data sequence to obtain n pieces of filtered data.

The high-pass filtering can eliminate impact of a constant acceleration or a constant angular velocity on sensor data. For example, the gravity of the Earth is a constant acceleration, and a constant acceleration can also be generated when the user is in an automobile.

The mobile terminal performs high-pass filtering on data in the data sequence to obtain the n pieces of filtered data.

At 206, for each piece of filtered data, it is detected whether the filtered data exceeds a preset threshold.

During normal use of the mobile terminal, the user may also perform an operation such as walking, going upstairs/downstairs, putting down the mobile phone, or picking up the mobile phone.

To distinguish a normal action from a shake operation of the user, the mobile terminal further detects whether the filtered data exceeds the preset threshold.

At 208, when the filtered data exceeds the preset threshold, a recognition result indicating that a shake operation occurs on the mobile terminal is generated. The recognition result indicating that a shake operation occurs on the mobile terminal is also referred to as a "shake recognition result."

In some embodiments, a recognition result indicating that one shake operation occurs on the mobile terminal is generated when the filtered data exceeds the preset threshold.

In other words, the recognition result is used for indicating that one shake operation is recognized. If the user continuously shakes the mobile terminal, multiple recognition results may be generated.

According to the operation recognition method provided in this embodiment, n pieces of filtered data are obtained by performing a high-pass filtering on a data sequence; for each piece of filtered data, whether the filtered data exceeds a preset threshold is detected; and a recognition result indicating that a shake operation occurs on a mobile terminal is generated when the filtered data exceeds the preset threshold. As such, a problem that a relatively high error rate in shake operation recognition is caused by interference from some factors, such as a gravitational acceleration and/or a constant acceleration generated when a user is in an automobile, is resolved. Therefore, an accuracy of the shake operation recognition can be improved by eliminating the interference from the constant acceleration or interference from a constant angular velocity by means of high-pass filtering.

FIG. 4 is a flowchart of an operation recognition method according to another embodiment of the present disclosure. The method shown in FIG. 4 is similar to the method shown in FIG. 2, except that process 204 in FIG. 2 is replaced with process 204a in FIG. 4, as described in detail below.

At 204a, the n pieces of filtered data are obtained through a calculation according to the following formula:

$$y[i]=\alpha^*y[i-1]+\alpha^*(x[i]-x[i-1])$$

where $x[i]$ is an $i^{th}$ piece of data in the data sequence, $y[i]$ is an $i^{th}$ piece of filtered data, $\alpha$ is a constant that is set according to a predetermined time interval, $x[0]=y[0]$, and $1 \leq i \leq n$.

Usually, $\alpha=RC/(RC+dt)$. RC is a constant that is set according to an empirical value, and dt is the predetermined time interval when the sensor collects data, for example, dt=0.05 s.

When the data sequence includes an acceleration data sequence corresponding to an x-axis, $x[i]$ is acceleration data of the x-axis collected at an interval of dt duration. When the data sequence includes an acceleration data sequence corresponding to a y-axis, $x[i]$ is acceleration data of the y-axis collected at an interval of dt duration. When the data sequence includes an angular velocity data sequence corresponding to the y-axis, $x[i]$ is angular velocity data of the y-axis collected at an interval of dt duration.

Pseudocode of process 204a is as follows:
function highpass(real[0 . . . n] x, real dt, real RC)
var real[0 . . . n] y
var real α=RC/(RC+dt)
y[0]:=x[0]
for i from 1 to n $$y[i]:=\alpha^*y[i-1]+\alpha^*(x[i]-x[i-1])$$

return y.

According to the method described above, by means of the foregoing formula, the constant acceleration or the constant angular velocity in x[i] can be gradually reduced to 0 in y[i]. As such, interference from factors such as a gravitational acceleration and a constant acceleration generated when a user is in an automobile on an operation recognition process can be eliminated.

Sometimes, different users may shake the mobile terminal in different manners. Further, different users may also have different understandings about "one shake." For example, if a mobile phone is shaken from a point A to a point B, and then back to the point A, some users may consider that the shake from A to B is one shake, but some users may consider that the shake from A to B then to A is one shake.

Figure 5:
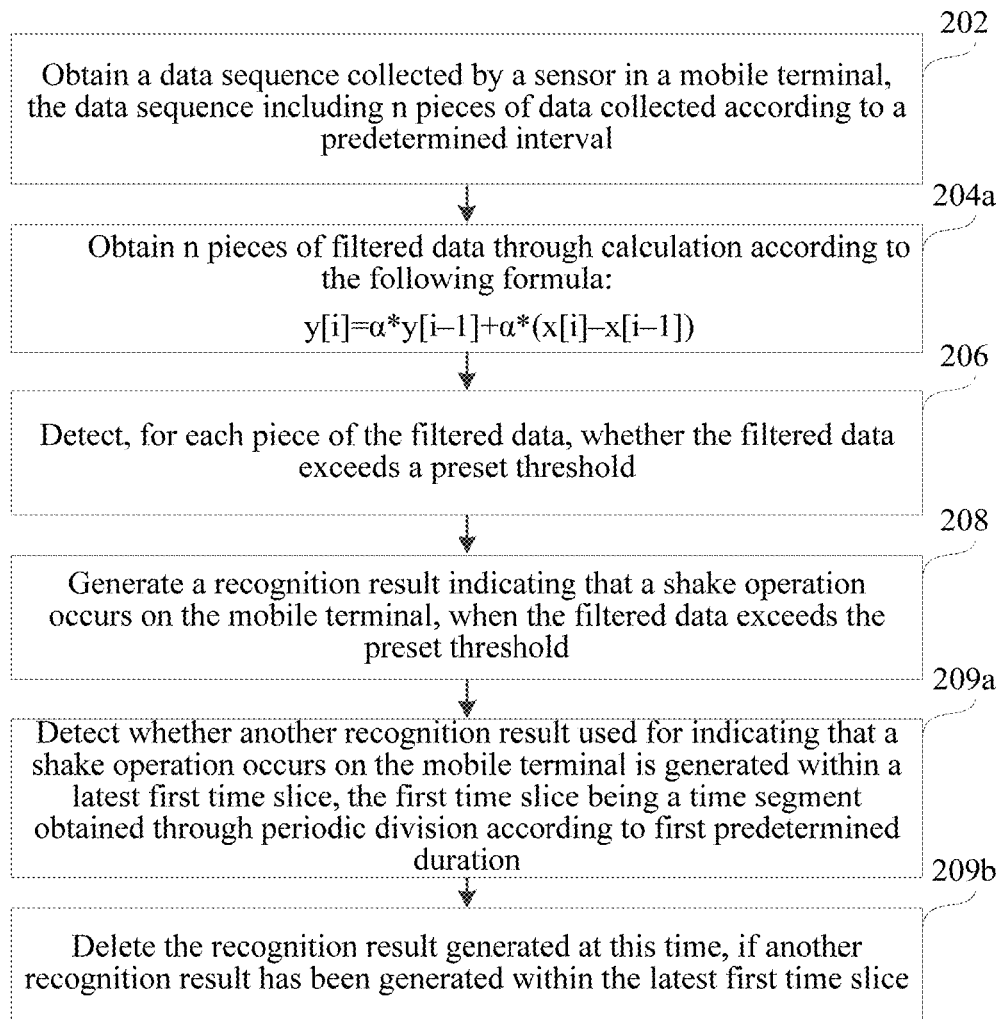
FIG. 5 is a flowchart of an operation recognition method according to another embodiment of the present disclosure.

Therefore, one shake considered by a user may be recognized as multiple shakes by the mobile terminal. To avoid the problem, further processes may be performed to recognize one shake. FIG. 5 is a flowchart of an operation recognition method according to another embodiment of the present disclosure. The method shown in FIG. 5 is similar to the method shown in FIG. 4, except that the method in FIG. 5 further includes processes 209a and 209b, as described in detail below.

At 209a, it is detected whether another recognition result indicating that a shake operation occurs on the mobile terminal has been generated within a latest first time slice. The first time slice is a time segment obtained through periodic division according to a first predetermined duration.

The first predetermined duration may be 180 ms.

At 209b, if the other recognition result has been generated within the latest first time slice, the recognition result generated at 208 is deleted.

For example, if a recognition result indicating that a shake operation occurs on the mobile terminal has been generated within 180 ms, then all other recognition results within the same 180 ms are deleted. In other words, even if a user shakes the mobile terminal for multiple times within 180 ms, the mobile terminal recognizes the shakes as only one shake.

According to the method in this embodiment, some recognition results may further be ignored when many shake operations are recognized, so that there is no need to process too many recognition results. As such, computational resources of the mobile terminal can be saved.

In some embodiments, the foregoing operation recognition method may be applied during a call between two mobile terminals. When a mobile terminal is shaken by a user, the mobile terminal generates a control instruction packet according to a recognition result, and sends the control instruction packet to a peer-end terminal, so that the peer-end terminal performs a predetermined operation according to the control instruction packet. The predetermined operation includes at least one of a vibration operation, a flickering operation, or an operation of displaying predetermined content. According to the controlling method, an emotion of a user can be transmitted between two mobile terminals during a call or an instant messaging communication.

Figure 6:
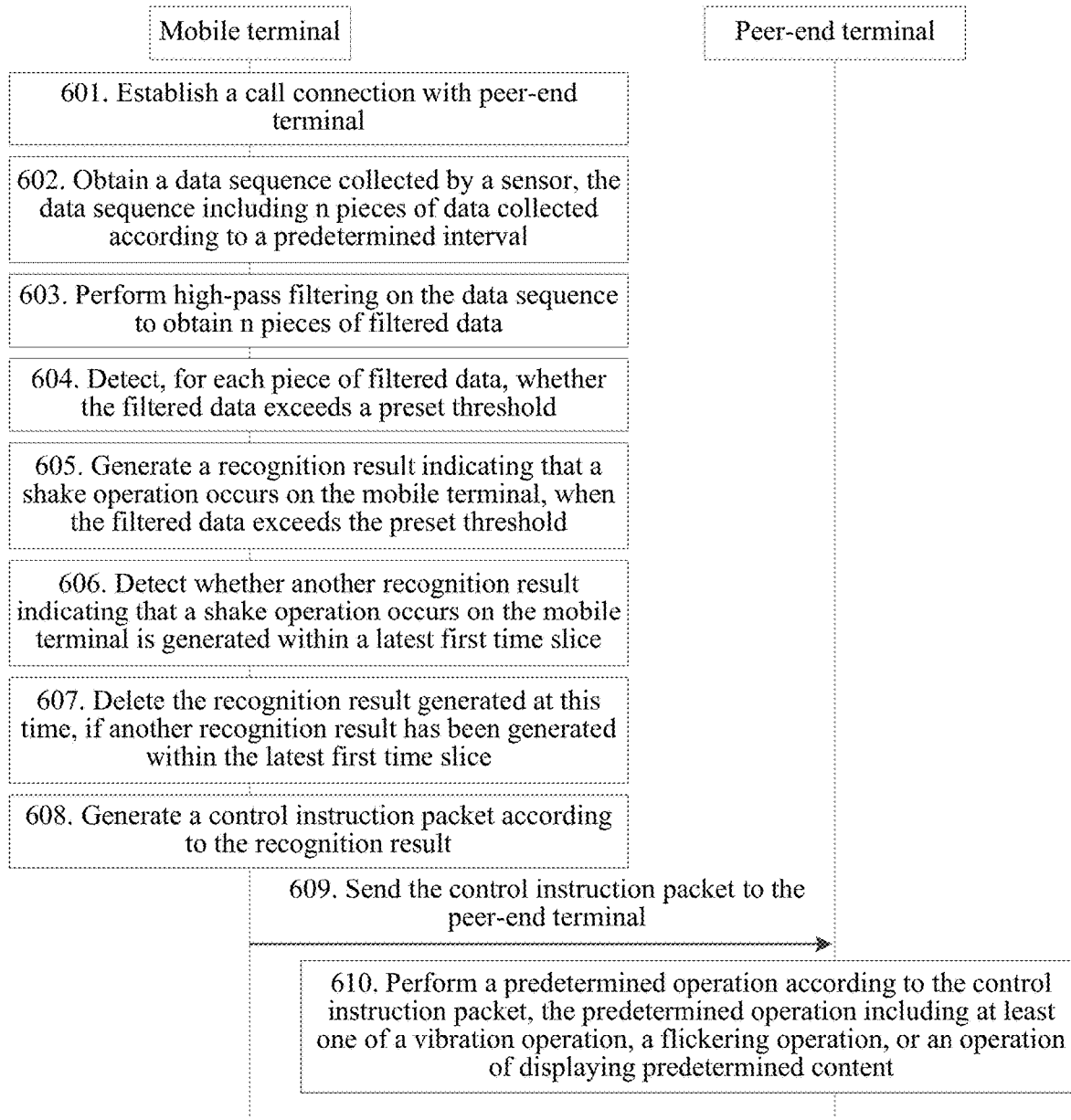
FIG. 6 is a flowchart of an operation recognition method according to another embodiment of the present disclosure.

FIG. 6 is a flowchart of an operation recognition method according to another embodiment of the present disclosure. This embodiment is described by using an example in which the operation recognition method is applied to a mobile terminal provided with a sensor. As shown in FIG. 6, at 601, the mobile terminal establishes a call connection with a peer-end terminal.

Optionally, the mobile terminal establishes a Voice over Internet Protocol (VoIP) phone connection with the peer-end terminal.

Optionally, after the mobile terminal establishes the call connection with the peer-end terminal, the mobile terminal starts the built-in sensor of the mobile terminal, and the sensor is configured to, during the call, collect data when a user operates the mobile terminal. That is, the sensor is a sensor configured to collect movement data of the mobile terminal.

At 602, the mobile terminal obtains a data sequence collected by the sensor. The data sequence includes n pieces of data collected according to a predetermined time interval.

During the call, the sensor in the mobile terminal collects data according to the predetermined time interval to obtain the data sequence.

When the sensor includes a three-axis accelerometer, the mobile terminal obtains an acceleration data sequence corresponding to an x-axis, and an acceleration data sequence corresponding to a y-axis that are collected by the three-axis accelerometer. The acceleration data sequence corresponding to the x-axis includes n pieces of x-axis acceleration data, and the acceleration data sequence corresponding to the y-axis includes n pieces of y-axis acceleration data.

When the sensor includes a gyro sensor, the mobile terminal obtains an angular velocity data sequence corresponding to the y-axis collected by the gyro sensor.

At 603, the mobile terminal performs a high-pass filtering on the data sequence to obtain n pieces of filtered data.

In some embodiments, the mobile terminal obtains the n pieces of filtered data through a calculation according to the following formula:

$$y[i]=\alpha*y[i-1]+\alpha*(x[i]-x[i-1])$$

x[i] is an $i^{th}$ piece of data in the data sequence, y[i] is an $i^{th}$ piece of filtered data, $\alpha$ is a constant that is set according to a predetermined time interval, x[0]=y[0], and $1 \leq i \leq n$. x[0] may be a constant, such as a gravitational angular velocity value.

Usually, $\alpha=RC/(RC+dt)$, RC is a constant that is set according to an empirical value, and dt is the time interval when the sensor collects data, for example, dt=0.05 s.

At 604, the mobile terminal detects, for each piece of filtered data, whether the filtered data exceeds a preset threshold.

During normal use of the mobile terminal, the user may also perform an operation such as walking, going upstairs/downstairs, putting down the mobile phone, or picking up the mobile phone.

To distinguish a normal action from a shake operation of the user, the mobile terminal further detects whether the filtered data exceeds the preset threshold. It should be noted that, multiple different types of predetermined thresholds can be preset in the mobile terminal.

That is, a first threshold can be preset for the acceleration data corresponding to the x-axis, a second threshold can be preset for the acceleration data corresponding to the y-axis, and a third threshold can be preset for the angular velocity data corresponding to the y-axis in the mobile terminal. Hence, the mobile terminal performs process 605 described below if a piece of acceleration data is greater than the first threshold in the acceleration data sequence corresponding to the x-axis, if a piece of acceleration data is greater than the second threshold in the acceleration data sequence corresponding to the y-axis, and/or if a piece of angular velocity data is greater than the third threshold in the angular velocity data sequence corresponding to the y-axis.

At 605, when the filtered data exceeds the preset threshold, the mobile terminal generates a recognition result indicating that a shake operation occurs on the mobile terminal.

For the $i^{th}$ piece of filtered data, if the $i^{th}$ piece of filtered data exceeds the preset threshold, the mobile terminal generates a recognition result indicating that a shake operation occurs on the mobile terminal. Optionally, the recognition result indicates that the $i^{th}$ piece of filtered data is a recognition result that one shake operation occurs on the mobile terminal.

For the $i^{th}$ piece of filtered data, if the $i^{th}$ filtered data does not exceed the preset threshold, the mobile terminal continues to detect an $(i+1)^{th}$ piece of filtered data.

At 606, the mobile terminal detects whether another recognition result indicating that a shake operation occurs on the mobile terminal has been generated within a latest first time slice. The first time slice is a time segment obtained through periodic division according to first predetermined duration.

The first predetermined duration may be 180 ms. To avoid a large number of recognition results being generated within a short time, the mobile terminal can extract only one valid recognition result within 180 ms, and other recognition results generated within the 180 ms are ignored.

At 607, the mobile terminal deletes the current recognition result generated this time, if the other recognition result has been generated within the latest first time slice.

At 608, the mobile terminal generates a control instruction packet according to the recognition result.

For a recognition result within each first time slice, the mobile terminal generates a control instruction packet according to the recognition result if the recognition result is a valid recognition result generated for the first time within the first time slice. The control instruction packet is used for controlling the peer-end terminal to perform a predetermined operation according to the control instruction packet. The predetermined operation includes at least one of a vibration operation, a flickering operation, or an operation of displaying predetermined content.

Optionally, the mobile terminal generates the control instruction packet by using the Protocol Buffers protocol.

Optionally, the mobile terminal generates the control instruction packet according to a quantity of recognition results within a predetermined duration. For example, when there is one recognition result within 1 s, a control instruction packet used for indicating reminding is generated; when there are two recognition results within 1 s, a control instruction packet used for indicating happiness is generated; when there are three recognition results within 1 s, a control instruction packet used for indicating anger is generated.

At 609, the mobile terminal sends the control instruction packet to the peer-end terminal.

The mobile terminal sends the control instruction packet to the peer-end terminal through the call connection. That is, the mobile terminal sends the control instruction packet to the peer-end terminal through a VoIP connection.

Optionally, to prevent the mobile terminal from frequently sending control instruction packets to the peer-end terminal, the mobile terminal further detects whether a quantity of control instruction packets sent to the peer-end terminal exceeds a predetermined threshold within a latest second time slice. The second time slice is a time segment obtained through periodic division according to a second predetermined duration. The second predetermined duration is longer than the first predetermined duration. If the quantity of the control instruction packets exceeds the predetermined threshold, the mobile terminal deletes the control instruction packet generated at this time.

For example, a user is allowed to shake at most 20 times within 5 s. When 20 control instruction packets have already been sent within 5 s, the mobile terminal stops sending further control instruction packets to the peer-end terminal, and informs the user on an interface of the mobile terminal that the shake operation is too frequent.

At 610, the peer-end terminal performs a predetermined operation according to the control instruction packet. The predetermined operation includes at least one of a vibration operation, a flickering operation, or an operation of displaying predetermined content.

Figure 7:
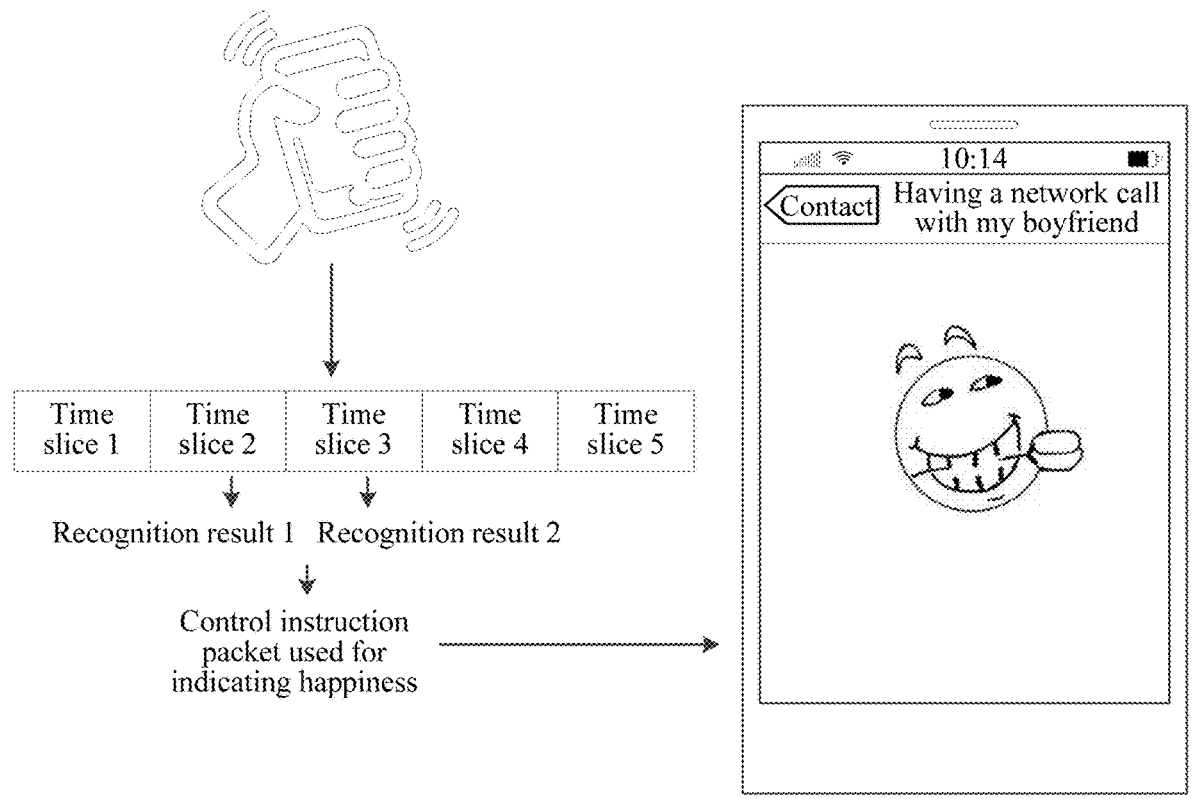
FIG. 7 is a schematic implementation diagram during implementation of the operation recognition method shown in FIG. 6.

For example, the peer-end terminal performs at least one of an operation of vibrating the body of the peer-end terminal, an operation of flickering an indicator, or an operation of displaying predetermined animation according to the control instruction packet. FIG. 7 schematically shows a control instruction packet indicating happiness. The peer-end terminal displays a special effect animation indicating happiness, and at the same time, the body of the peer-end terminal vibrates once.

Optionally, due to network latency, the peer-end terminal may receive many control instruction packets within a short time. To avoid processing too many control instruction packets, each time when the peer-end terminal receives a control instruction packet, the peer-end terminal further detects whether a quantity of the received control instruction packets exceeds a predetermined threshold within a third time slice. The third time slice is a time segment obtained through periodic division according to third predetermined duration, and the third predetermined duration usually equals the first predetermined duration. If the quantity of the control instruction packets exceeds the predetermined threshold within the latest third time slice, the peer-end terminal deletes the control instruction packet generated at this time without processing the control instruction packet.

According to the operation recognition method provided in this embodiment, n pieces of filtered data are obtained by performing a high-pass filtering on a data sequence; for each piece of filtered data, whether the filtered data exceeds a preset threshold is detected; and a recognition result indicating that a shake operation occurs on a mobile terminal is generated when the filtered data exceeds the preset threshold. As such, a problem that a relatively high error rate in shake operation recognition is caused by interference from some factors, such as a gravitational acceleration and/or a constant acceleration generated when a user is in an automobile, is resolved. Therefore, an accuracy of the shake operation recognition can be improved by eliminating the interference from the constant acceleration or interference from a constant angular velocity by means of high-pass filtering.

According to the operation recognition method provided in this embodiment, the mobile terminal further generates a control instruction packet according to the recognition result during a network call, and sends the control instruction packet to a peer-end terminal, so that the peer-end terminal performs a predetermined operation according to the control instruction packet. Therefore, an emotion of a user may be transmitted between two mobile terminals during a call or an instant messaging communication, and an effect of a communication manner is added.

Figure 8:
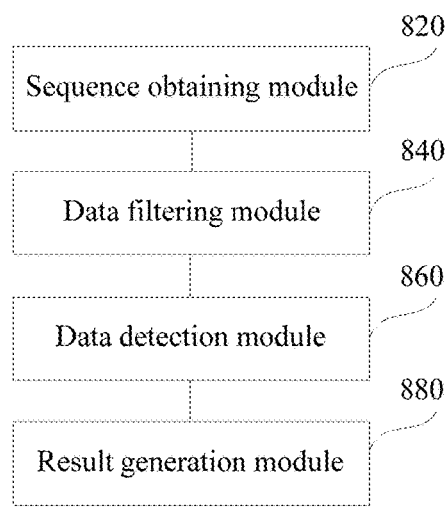
FIG. 8 is a structural block diagram of an operation recognition apparatus according to an embodiment of the present disclosure.

FIG. 8 shows a structural block diagram of an operation recognition apparatus according to an embodiment of the present disclosure. The operation recognition apparatus may be implemented as all or a part of a mobile terminal having a built-in sensor by using software, hardware, or a combination of the two. The apparatus includes a sequence obtaining module 820, a data filtering module 840, a data detection module 860, and a result generation module 880.

The sequence obtaining module 820 is configured to obtain a data sequence collected by the sensor of the mobile terminal. The data sequence includes n pieces of data collected according to a predetermined time interval, and the sensor is a sensor configured to collect movement data of the mobile terminal.

The data filtering module 840 is configured to perform a high-pass filtering on the data sequence to obtain n pieces of filtered data.

The data detection module 860 is configured to detect, for each piece of filtered data, whether the filtered data exceeds a preset threshold.

The result generation module 880 is configured to generate a recognition result indicating that a shake operation occurs on the mobile terminal, when the filtered data exceeds the preset threshold.

According to the operation recognition apparatus provided in this embodiment, n pieces of filtered data are obtained by performing a high-pass filtering on a data sequence; for each piece of filtered data, whether the filtered data exceeds a preset threshold is detected; and a recognition result indicating that a shake operation occurs on a mobile terminal is generated when the filtered data exceeds the preset threshold. As such, a problem that a relatively high error rate in shake operation recognition is caused by interference from some factors, such as a gravitational acceleration and/or a constant acceleration generated when a user is in an automobile, is resolved. Therefore, an accuracy of the shake operation recognition can be improved by eliminating the interference from the constant acceleration or interference from a constant angular velocity by means of high-pass filtering.

Figure 9:
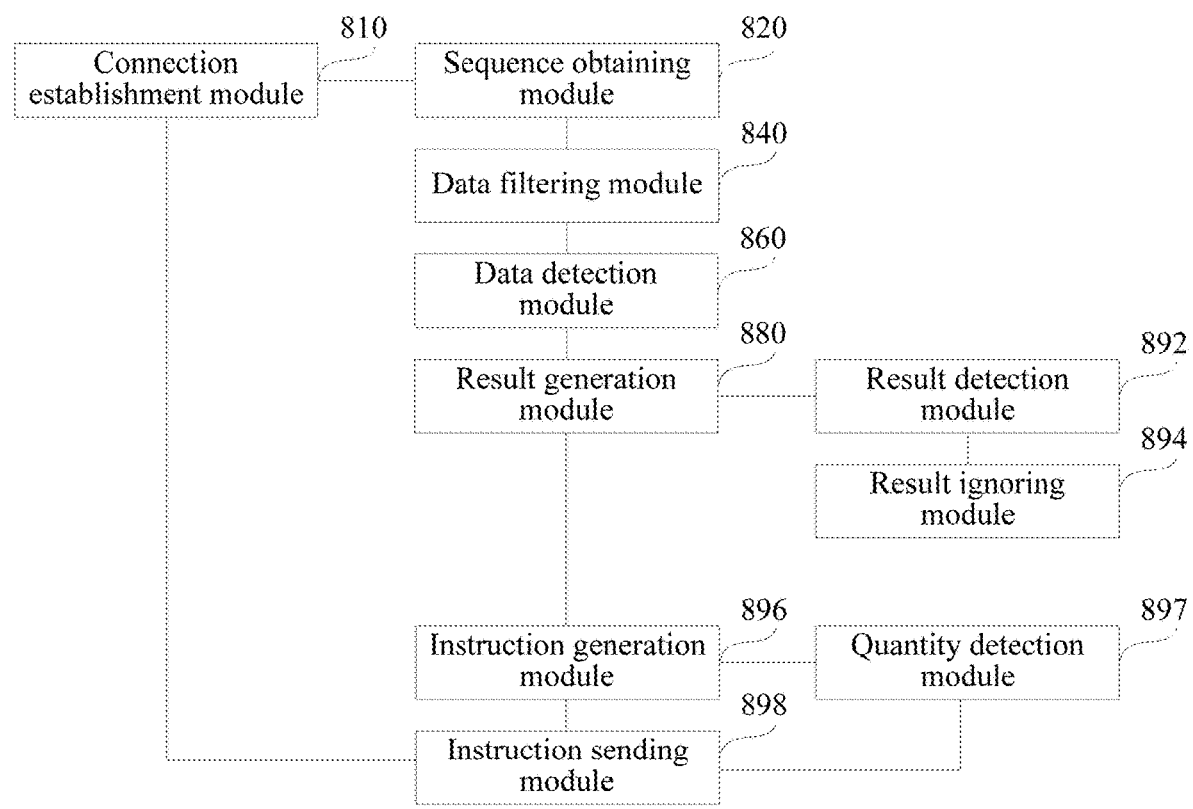
FIG. 9 is a structural block diagram of an operation recognition apparatus according to another embodiment of the present disclosure.

FIG. 9 shows a structural block diagram of an operation recognition apparatus according to another embodiment of the present disclosure. The operation recognition apparatus may be implemented as all or a part of a mobile terminal having a built-in sensor by using software, hardware, or a combination of the two. The apparatus includes the sequence obtaining module 820, the data filtering module 840, the data detection module 860, and the result generation module 880.

The sequence obtaining module 820 is configured to obtain a data sequence collected by the sensor of the mobile terminal. The data sequence includes n pieces of data collected according to a predetermined time interval, and the sensor is a sensor configured to collect movement data of the mobile terminal.

The data filtering module 840 is configured to perform a high-pass filtering on the data sequence to obtain n pieces of filtered data.

The data detection module 860 is configured to detect, for each piece of filtered data, whether the filtered data exceeds a preset threshold.

The result generation module 880 is configured to generate a recognition result indicating that a shake operation occurs on the mobile terminal, when the filtered data exceeds the preset threshold.

Optionally, the data filtering module 840 is configured to obtain the n pieces of filtered data by means of calculation according to the following formula:

$$y[i]=\alpha*y[i-1]+\alpha*(x[i]-x[i-1])$$

where $x[i]$ is an $i^{th}$ piece of data in the data sequence, $y[i]$ is an $i^{th}$ piece of filtered data, $\alpha$ is a constant that is set according to a predetermined time interval, $x[0]=y[0]$, and $1 \le i \le n$.

Optionally, the apparatus further includes a result detection module 892 and a result ignoring module 894.

The result detection module 892 is configured to detect whether the recognition result indicating that a shake operation occurs on the mobile terminal is generated within a latest first time slice. The first time slice is a time segment obtained through periodic division according to first predetermined duration.

The result ignoring module 894 is configured to delete the recognition result generated at this time if another recognition result has been generated within the latest first time slice.

Optionally, the sensor includes a three-axis accelerometer and/or a gyro sensor. The data sequence includes an acceleration data sequence corresponding to an x-axis or an acceleration data sequence corresponding to a y-axis, and/or the data sequence includes an angular velocity data sequence collected by using the y-axis as a rotation axis. The x-axis is parallel to the horizontal direction of a front face of the mobile terminal, and the y-axis is parallel to the vertical direction of the front face of the mobile terminal.

Optionally, the apparatus further includes an instruction generation module 896 and an instruction sending module 898.

The instruction generation module 896 is configured to generate a control instruction packet according to the recognition result.

The instruction sending module 898 is configured to send the control instruction packet to a peer-end terminal, so that the peer-end terminal performs a predetermined operation according to the control instruction packet. The predetermined operation includes at least one of a vibration operation, a flickering operation, or an operation of displaying predetermined content.

Optionally, the apparatus further includes a connection establishment module 810 configured to establish a call connection with the peer-end terminal. The instruction sending module 898 is configured to send the control instruction packet to the peer-end terminal through the call connection.

Optionally, the apparatus further includes a quantity detection module 897 configured to detect whether a quantity of control instruction packets sent to the peer-end terminal exceeds a predetermined threshold within a latest second time slice. The second time slice is a time segment obtained through periodic division according to second predetermined duration. The instruction sending module 898 is configured to not send the control instruction packet generated at this time, if the quantity of the control instruction packets exceeds the predetermined threshold.

It should be noted that, the above-described functional modules of the operation recognition apparatus are merely examples for description purposes. In a practical application, the functions may be allocated to different function modules according to need. That is, an internal structure of the apparatus can be divided into different function modules, so as to implement all or some of the functions described above. In addition, the operation recognition apparatus provided in the foregoing embodiments and the embodiments of the operation recognition methods are directed to a same concept. The method embodiments can be referenced to for specific implementation processes of the operation recognition apparatus, and thus detailed description thereof is omitted.

Figure 10:
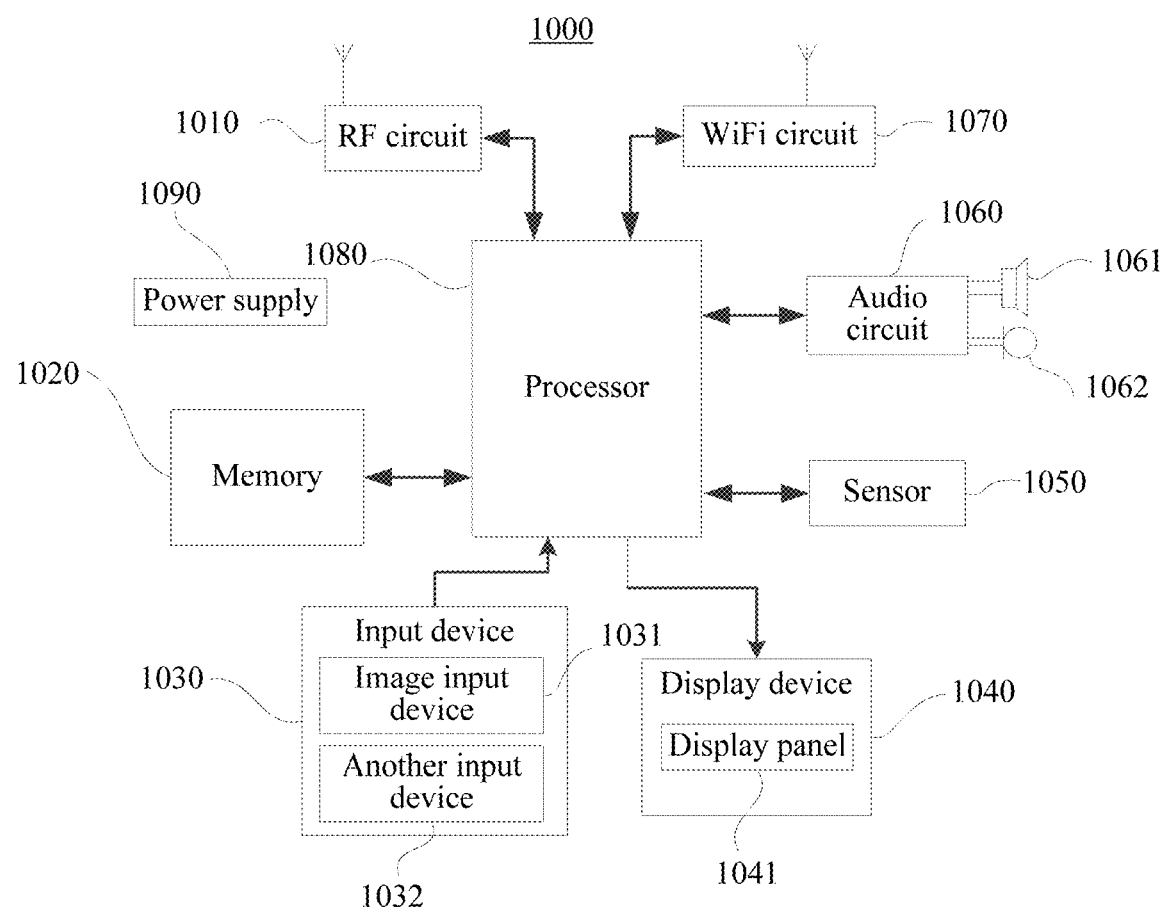
FIG. 10 is a structural block diagram of a mobile terminal according to an embodiment of the present disclosure.

FIG. 10 is a schematic structural diagram of a mobile terminal according to an embodiment of the present disclosure. The mobile terminal is configured to implement the operation recognition method provided in the foregoing embodiment.

As shown in FIG. 10, the mobile terminal 1000 includes components such as a radio frequency (RF) circuit 1010, a memory 1020 including one or more computer readable storage media, an input device 1030, a display device 1040, a sensor 1050, an audio circuit 1060, a wireless fidelity (WiFi) circuit 1070, a processor 1080 including one or more processing cores, and a power supply 1090. A person skilled in the art may understand that, the structure of the mobile terminal shown in FIG. 10 does not constitute a limitation to the mobile terminal, and the mobile terminal may include more components or fewer components than those shown in the figure, or some components may be combined, or a different component deployment may be used.

The RF circuit 1010 may be configured to receive and send signals during an information receiving and sending process or a call process. In some embodiments, the RF circuit 1010 receives downlink information from a base station, delivers the downlink information to the one or more processors 1080 for processing, and sends related uplink data to the base station. Generally, the RF circuit 1010 includes, but is not limited to, an antenna, at least one amplifier, a tuner, one or more oscillators, a subscriber identity module (SIM) card, a transceiver, a coupler, a low noise amplifier (LNA), and/or a diplexer, etc. In addition, the RF circuit 1010 may also communicate with a network and another device through wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), or the like.

The memory 1020 may be configured to store a software program and module. The processor 1080 runs the software program and module stored in the memory 1020, to implement various functional applications and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to the use of the mobile terminal 1000, and the like. In addition, the memory 1020 may include a high speed random access memory, and/or may also include a non-volatile memory, such as at least one of a magnetic disk storage device, a flash memory, or another volatile solid-state storage device. Correspondingly, the memory 1020 may further include a memory controller, so as to allow the processor 1080 and the input unit 1030 to access the memory 1020.

The input device 1030 may be configured to receive input digit or character information, and generate a keyboard, mouse, joystick, optical, or track ball signal input related to the user setting and function control. Specifically, the input device 1030 may include an image input device 1031. The image input device 1031 may be a camera, or may be an optoelectronic scanning device. In addition to the image input device 1031, the input unit 1030 may further include another input device 1032. Specifically, the another input device 1032 may include, but is not limited to, one or more of a physical keyboard, a function key (such as a volume control key or a switch key), a track ball, a mouse, and a joystick.

The display device 1040 may be configured to display information input by the user or information provided to the user, and various graphical user interfaces of the mobile terminal 1000. The graphical user interfaces may include a graph, text, an icon, a video, or any combination thereof. The display device 1040 may include a display panel 1041. Optionally, the display panel 1041 may include a liquid crystal display (LCD), an organic light-emitting diode (OLED), or the like.

The mobile terminal 1000 may further include at least one sensor 1050, such as an optical sensor, a motion sensor, or another sensor. Specifically, the optical sensor may include an ambient light sensor and a proximity sensor. The ambient light sensor can adjust a luminance of the display panel 1041 according to a brightness of the ambient light. The proximity sensor may switch off the display panel 1041 and/or a backlight when the mobile terminal 1000 is moved close to an ear. The motion sensor may include a gravity acceleration sensor that may detect magnitudes of accelerations in various directions (generally on three axes), may detect a magnitude and a direction of the gravity when the mobile terminal 1000 is static, and may be applied to an application that recognizes the attitude of the mobile phone (for example, switching between landscape orientation and portrait orientation, a related game, and magnetometer attitude calibration), a function related to vibration recognition (such as a pedometer and a knock), or the like. The mobile terminal 1000 may include other sensors such as a gyroscope, a barometer, a hygrometer, a thermometer, and/or an infrared sensor, which are not further described herein.

The mobile terminal 1000 can also include a speaker 1061 and a microphone 1062. The audio circuit 1060, the speaker 1061, and the microphone 1062 may provide audio interfaces between the user and the mobile terminal 1000. The audio circuit 1060 may convert received audio data into an electric signal and transmit the electric signal to the speaker 1061. The speaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another mobile terminal by using the RF circuit 1010, or outputs the audio data to the memory 1020 for further processing. The audio circuit 1060 may further include an earplug jack, so as to provide communication between a peripheral earphone and the mobile terminal 1000.

WiFi is a short distance wireless transmission technology. The mobile terminal 1000 may help, by using the WiFi circuit 1070, the user to receive and send emails, browse a web page, access streaming media, and so on, which provides wireless broadband Internet access for the user. Although the WiFi circuit 1070 is shown in FIG. 10, it may be understood that the WiFi circuit is not a necessary component of the mobile terminal 1000, and when required, the WiFi circuit may be omitted as long as the scope of the present disclosure is not changed.

The processor 1080 is the control center of the mobile terminal 1000, and is connected to various parts of the mobile terminal 1000 by using various interfaces and lines. By running or executing the software program and/or module stored in the memory 1020, and invoking data stored in the memory 1020, the processor 1080 performs various functions and data processing of the mobile terminal 1000, thereby performing overall monitoring on the mobile terminal 1000. Optionally, the processor 1080 may include one or more processor cores. In some embodiments, the processor 1080 may include an application processor and a modem integrated together. The application processor mainly processes an operating system, a user interface, an application program, and the like. The modem mainly processes wireless communications. It may be understood that the foregoing modem may also not be integrated into the processor 1080.

The mobile terminal 1000 further includes the power supply 1090 (such as a battery) for supplying power to the components. In some embodiments, the power supply may be logically connected to the processor 1080 by using a power management system, thereby implementing functions such as charging, discharging and power consumption management by using the power management system. The power supply 1090 may further include one or more of a direct current or alternating current power supply, a recharging system, a power failure detection circuit, a power supply converter or inverter, a power supply state indicator, and any other components.

Although not shown in the figure, the mobile terminal 1000 may further include a Bluetooth circuit and the like, which are not further described herein.

Specifically, in this embodiment, the mobile terminal 1000 further includes a memory, and one or more programs. The one or more programs are stored in the memory and configured to be executed by one or more processors. The one or more programs contain instructions used for implementing the operation recognition method.

A person of ordinary skill in the art can understand that all or part of the operation recognition method in the embodiments may be implemented by a program instructing relevant hardware. The program may be stored in a computer readable storage medium, and the storage medium may include a read-only memory (ROM), a random access memory (RAM), a magnetic disk, an optical disk, or the like.

The foregoing descriptions are merely embodiments of the present disclosure, but are not intended to limit the present disclosure. Any modification, equivalent replacement, and improvement made without departing from the spirit and principle of the present disclosure shall fall within the scope of the present disclosure.

What is claimed is:

1. An operation recognition method, comprising:
   obtaining a data sequence, the data sequence including n pieces of data reflecting a movement of a mobile terminal;
   performing high-pass filtering on the data sequence to obtain n pieces of filtered data;
   generating within a first time segment, when one of the n pieces of filtered data exceeds a preset threshold, a first shake recognition result indicating that a shake operation occurs on the mobile terminal; and
   deleting the first shake recognition result if a first previous shake recognition result has been generated within the first time segment.

2. The method according to claim 1, wherein the data sequence includes an angular velocity data sequence collected by using a y-axis as a rotation axis, and wherein the y-axis is parallel to a vertical direction of a front face of the mobile terminal.

3. The method according to claim 1, further comprising:
   generating a control instruction packet according to the first shake recognition result; and
   sending the control instruction packet to a peer-end terminal for instructing the peer-end terminal to perform a predetermined operation, the predetermined operation including at least one of a vibration operation, a flickering operation, and an operation of displaying predetermined content.

4. The method according to claim 3, further comprising:
   establishing a call connection with the peer-end terminal; and
   sending the control instruction packet to the peer-end terminal through the call connection.

5. The method according to claim 3, further comprising:
   deleting the control instruction packet if a quantity of previous control instruction packets sent to the peer-end terminal within the first time segment exceeds a predetermined threshold.

6. An operation recognition apparatus, comprising: a processor; and a memory storing a computer program that, when executed by the processor, causes the processor to:
   obtain a data sequence, the data sequence comprising including n pieces of data reflecting a movement of a mobile terminal;
   perform high-pass filtering on the data sequence to obtain n pieces of filtered data;
   generate within a first time segment, when one of the n pieces of filtered data exceeds a preset threshold, a first shake recognition result indicating that a shake operation occurs on the mobile terminal; and
   delete the first shake recognition result if a first previous shake recognition result has been generated within the first time segment.

7. The apparatus according to claim 6, wherein the data sequence includes an angular velocity data sequence collected by using a y-axis as a rotation axis, and wherein the y-axis is parallel to a vertical direction of a front face of the mobile terminal.

8. The apparatus according to claim 6, wherein the computer program further causes the processor to:
   generate a control instruction packet according to the first shake recognition result; and
   send the control instruction packet to a peer-end terminal for instructing the peer-end terminal to perform a predetermined operation, the predetermined operation including at least one of a vibration operation, a flickering operation, and an operation of displaying predetermined content.

9. The apparatus according to claim 8, wherein the computer program further causes the processor to:
   establish a call connection with the peer-end terminal; and
   send the control instruction packet to the peer-end terminal through the call connection.

10. The apparatus according to claim 8, wherein the computer program further causes the processor to:
    delete the control instruction packet if a quantity of previous control instruction packets sent to the peer-end terminal within the first time segment exceeds a predetermined threshold.

11. A mobile terminal, comprising: a sensor configured to collect a data sequence including n pieces of data reflecting a movement of the mobile terminal; a processor; and a memory storing a computer program that, when executed by the processor, causes the processor to:
    obtain the data sequence;
    perform high-pass filtering on the data sequence to obtain n pieces of filtered data;
    generate within a first time segment, when one of the n pieces of filtered data exceeds a preset threshold, a first shake recognition result indicating that a shake operation occurs on the mobile terminal; and
delete the first shake recognition result if a first previous shake recognition result has been generated within the first time segment.

12. The mobile terminal according to claim 11, wherein the computer program further causes the processor to:
generate a control instruction packet according to the first shake recognition result; and
send the control instruction packet to a peer-end terminal for instructing the peer-end terminal to perform a predetermined operation, the predetermined operation including at least one of a vibration operation, a flickering operation, and an operation of displaying predetermined content.

13. The mobile terminal according to claim 11, wherein the computer program further causes the processor to:
establish a call connection with the peer-end terminal; and
send the control instruction packet to the peer-end terminal through the call connection.

14. The mobile terminal according to claim 11, wherein the computer program further causes the processor to:
delete the control instruction packet if a quantity of previous control instruction packets sent to the peer-end terminal within the first time segment exceeds a predetermined threshold.

15. The method according to claim 1, further comprising:
generating a second shake recognition result within a second time segment different than the first time segment;
generating a third shake recognition result within a third time segment different than the first or the second time segment, wherein the first, second, and third time segments are each part of a predetermined duration; and
generating, according to at least one of the first, second, and third shake recognition results, a control instruction packet to indicate an emotion.

16. The method according to claim 15, wherein the control instruction packet is generated to indicate an emotion-one according to one of the first, second, and third shake recognition results, to indicate an emotion-two different than the emotion-one according to two of the first, second, and third shake recognition results, and to indicate an emotion-three different than the emotion-one and the emotion-two according to all of the first, second, and third shake recognition results.

17. The operation recognition apparatus according to claim 6, wherein the computer program further causes the processor to:
generate a second shake recognition result within a second time segment different than the first time segment;
generate a third shake recognition result within a third time segment different than the first or the second time segment, wherein the first, second, and third time segments are each part of a predetermined duration; and
generate, according to at least one of the first, second, and third shake recognition results, a control instruction packet to indicate an emotion.

18. The operation recognition apparatus according to claim 17, wherein the control instruction packet is generated to indicate an emotion-one according to one of the first, second, and third shake recognition results, to indicate an emotion-two different than the emotion-one according to two of the first, second, and third shake recognition results, and to indicate an emotion-three different than the emotion-one and the emotion-two according to all of the first, second, and third shake recognition results.

19. The mobile terminal according to claim 11, wherein the computer program further causes the processor to:
generate a second shake recognition result within a second time segment different than the first time segment;
generate a third shake recognition result within a third time segment different than the first or the second time segment, wherein the first, second, and third time segments are each part of a predetermined duration; and
generate, according to at least one of the first, second, and third shake recognition results, a control instruction packet to indicate an emotion.

20. The mobile terminal according to claim 19, wherein the control instruction packet is generated to indicate an emotion-one according to one of the first, second, and third shake recognition results, to indicate an emotion-two different than the emotion-one according to two of the first, second, and third shake recognition results, and to indicate an emotion-three different than the emotion-one and the emotion-two according to all of the first, second, and third shake recognition results.

* * * * *